(12) United States Patent
Doujou et al.

(10) Patent No.: US 12,044,831 B2
(45) Date of Patent: Jul. 23, 2024

(54) OPTICAL SYSTEM HAVING CEMENTED LENS INCLUDING NEGATIVE LENS, IMAGE PICKUP APPARATUS, IN-VEHICLE SYSTEM, AND MOVING APPARATUS

(71) Applicant: CANON KABUSHIKI KAISHA, Tokyo (JP)

(72) Inventors: Naoto Doujou, Tochigi (JP); Kazuhiko Kajiyama, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 92 days.

(21) Appl. No.: 17/820,636

(22) Filed: Aug. 18, 2022

(65) Prior Publication Data

US 2023/0076225 A1    Mar. 9, 2023

(30) Foreign Application Priority Data

Sep. 3, 2021  (JP) ................................ 2021-143951

(51) Int. Cl.
*G02B 13/00*   (2006.01)
*G03B 30/00*   (2021.01)

(52) U.S. Cl.
CPC .......... *G02B 13/006* (2013.01); *G03B 30/00* (2021.01)

(58) Field of Classification Search
CPC .......... G02B 13/006; G02B 9/60; G02B 9/62; G02B 13/0015; G02B 13/04; G03B 30/00
See application file for complete search history.

(56) References Cited

U.S. PATENT DOCUMENTS

| | | | | |
|---|---|---|---|---|
| 7,911,712 B2 * | 3/2011 | Kitahara | .................. | G02B 9/60 359/770 |
| 8,780,463 B2 * | 7/2014 | Ohashi | ..................... | G02B 9/64 359/753 |
| 9,817,217 B2 * | 11/2017 | Nakayama | ........... | G02B 13/006 |
| 9,915,803 B2 * | 3/2018 | Suzuki | ..................... | G02B 9/60 |
| 9,983,389 B2 * | 5/2018 | Lee | .................... | G02B 13/0045 |
| 10,209,494 B2 * | 2/2019 | Usui | .................. | G02B 13/0045 |
| 2007/0229982 A1 * | 10/2007 | Minakawa | ............... | G02B 9/08 359/740 |
| 2016/0299317 A1 * | 10/2016 | Ikegaya | .................... | G02B 9/10 |
| 2017/0219803 A1 * | 8/2017 | Lee | .......................... | G02B 9/62 |
| 2017/0293111 A1 * | 10/2017 | Ikegaya | ............... | G02B 13/006 |
| 2019/0092235 A1 * | 3/2019 | Kim | ....................... | B60Q 9/008 |
| 2020/0110240 A1 * | 4/2020 | Wang | ..................... | G02B 7/022 |
| 2020/0132973 A1 * | 4/2020 | Matsunaga | .......... | G02B 13/006 |
| 2020/0192066 A1 * | 6/2020 | Lai | ......................... | G02B 13/06 |
| 2020/0233195 A1 * | 7/2020 | Day | ..................... | G02B 21/002 |
| 2022/0026686 A1 * | 1/2022 | Wang | ................... | G02B 13/006 |

FOREIGN PATENT DOCUMENTS

| | | |
|---|---|---|
| JP | 6436787 B2 | 12/2018 |
| JP | 2021-43376 A | 3/2021 |
| WO | 10/001955 A1 | 1/2010 |
| WO | 17/170284 A1 | 10/2017 |

* cited by examiner

*Primary Examiner* — Jared Walker
(74) *Attorney, Agent, or Firm* — Canon U.S.A., Inc., IP Division

(57) ABSTRACT

An optical system includes a diaphragm, and a first cemented lens disposed adjacent to an object side of the diaphragm. The first cemented lens included a negative lens. A predetermined condition is satisfied.

13 Claims, 8 Drawing Sheets

OPTICAL SYSTEM HAVING CEMENTED LENS INCLUDING NEGATIVE LENS, IMAGE PICKUP APPARATUS, IN-VEHICLE SYSTEM, AND MOVING APPARATUS

BACKGROUND

Technical Field

The disclosure relates to an optical system, an image pickup apparatus, an in-vehicle system, and a moving apparatus.

Description of the Related Art

Low-cost and high-performance optical systems are demanded for image pickup apparatuses such as in-vehicle cameras and surveillance cameras. Japanese Patent No. ("JP") 6436787 discloses a lens barrel (optical system) for an image pickup apparatus.

The processing cost of the lens barrel is determined according to the complexity of the internal structure of the lens barrel, and thus a simpler structure is demanded. An outer diameter of a lens included in the lens barrel changes depending on the specifications of wide-angle and telephoto lenses, such as an F-number, an angle of view, and a focal length. Thus, like the lens barrel disclosed in JP 6436787, the inside of the lens barrel needs a complicated shape such as a stepped structure in order to hold the lens.

SUMMARY

The disclosure provides an optical system, image pickup apparatus, in-vehicle system, and moving apparatus, each of which can be easily manufactured and have a high performance.

An optical system according to one aspect of the disclosure includes a diaphragm, and a first cemented lens disposed adjacent to an object side of the diaphragm. The first cemented lens included a negative lens. The following inequality is satisfied:

$$1.5 < D1/D0 < 15.0$$

where D0 is an effective diameter of the negative lens, and D1 is an outer diameter of the negative lens. An image pickup apparatus, in-vehicle system, and moving apparatus having the above optical system also constitute another aspect of the disclosure.

Further features of the disclosure will become apparent from the following description of exemplary embodiments with reference to the attached drawings.

DESCRIPTION OF THE EMBODIMENTS

Figure 1:
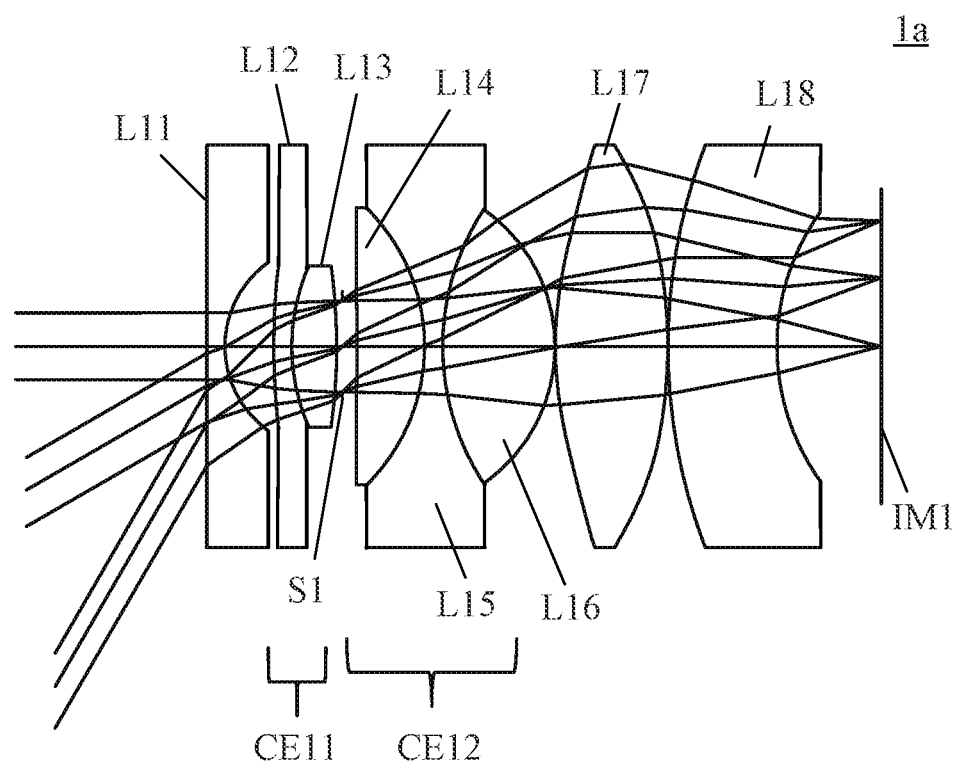
FIG. 1 is a sectional view of an optical system according to Example 1.

Referring now to the accompanying drawings, a detailed description will be given of embodiments according to the disclosure. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above.

A description will now be given of the process to this embodiment. Since the processing cost of the lens barrel depends on the complexity of the internal structure of the lens barrel, the lens barrel needs a simple structure in an attempt to reduce the cost. A lathe processing machine serves as a processing machine that can provide relatively low-cost processing. The simplest structure processable by the lathe processing machine is a cylindrical shape (pipe structure). However, it is difficult to make equal the outer diameters of the lenses inside the cylindrical lens barrel because a difference between the maximum outer diameter and the minimum outer diameter of the lenses inside the lens barrel depends on the specifications of the wide-angle and telephoto lenses. Especially in a case of a wide-angle lens, an outer diameter of a lens near a diaphragm (aperture stop) tends to be smaller than an outer diameter of a lens on the object or image plane side.

In the aberration correction of the lens, cementing a positive lens and a negative lens near the diaphragm is very useful to correct chromatic aberration. A positive lens is a lens that has a center cross-section greater in thickness than that at the edge. A negative lens is a lens that has a center cross-section thinner in thickness than that at the edge. Arranging the positive lens and the negative lens via an air layer between them instead of the cemented lens is also effective in the aberration correction. However, in a case where the outer diameter of the positive lens having a small radius of curvature is extended in the radial direction, it is difficult to make the lens diameter equal to that of another lens because the edge will reduce, damages are likely to occur during processing, and it is difficult for the lens barrel to hold the lens. In addition, in order to secure the edge thickness and make the outer diameter of the lens equal to that of another lens, it is necessary to restrict the radius of curvature of the positive lens and the lens design freedom is lost.

On the other hand, in the case where the outer diameter of the negative lens can be extended in the radial direction while the radius of curvature and the edge thickness are maintained, but it is also possible to extend the lens diameter in the direction orthogonal to the optical axis and the difficulty level is not so high from the viewpoint of lens processing.

Each example can make the outer diameter of the cemented lens equal to that of another lens by extending the negative lens of the cemented lens disposed near the diaphragm in the radial direction of the lens while maintaining the radius of curvature of the negative lens, or by extending the negative lens in the direction orthogonal to the optical axis. Thus, an optical system using a low-cost cylindrical lens barrel can be configured. A description will now be given of each example below.

Figure 3:
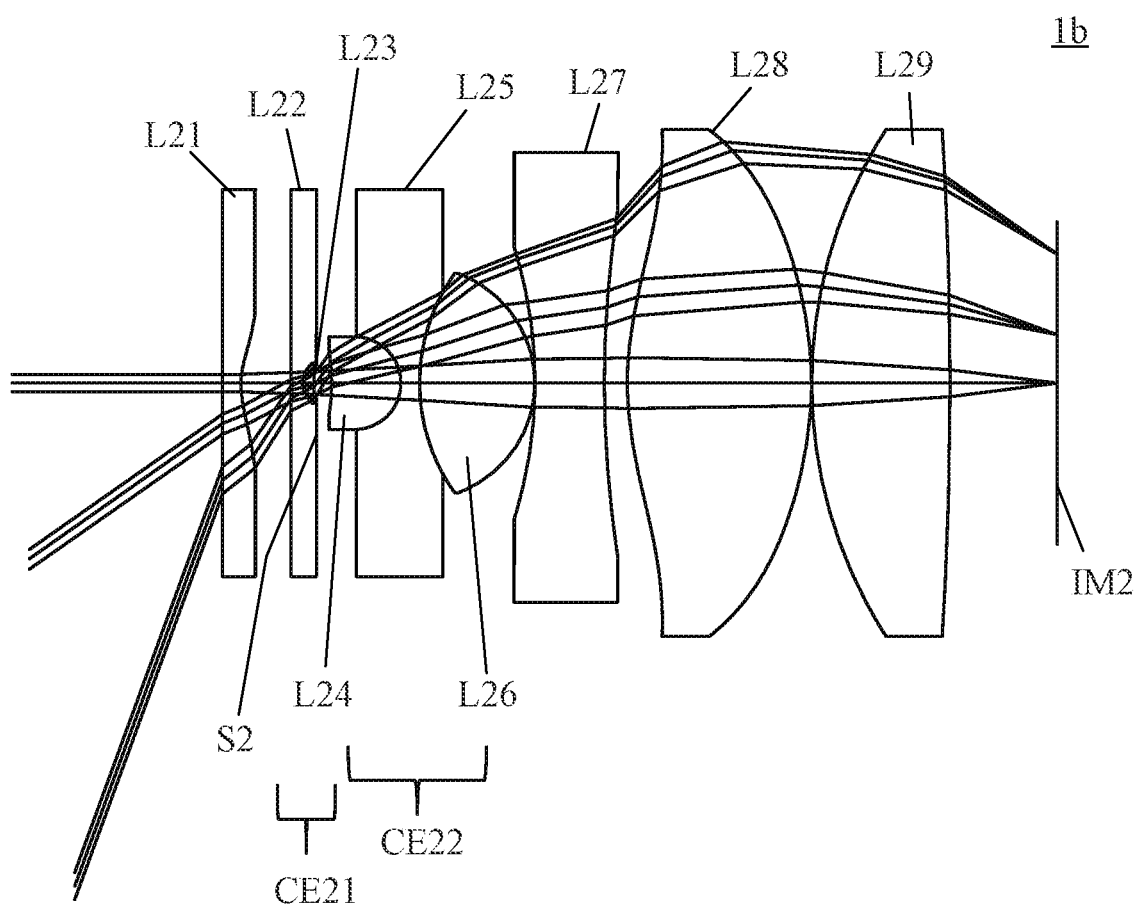
FIG. 3 is a sectional view of an optical system according to Example 2.
Figure 5:
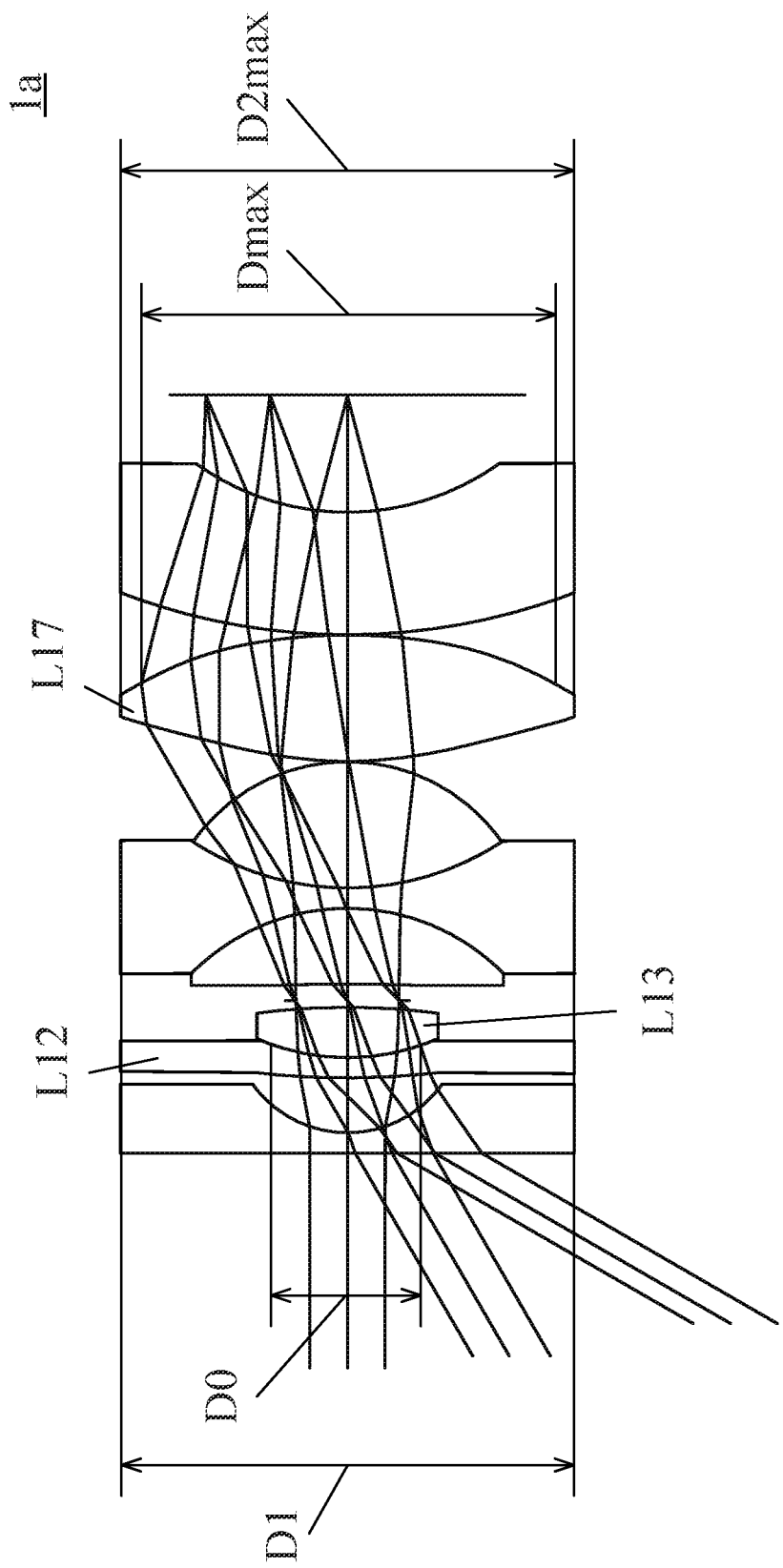
FIG. 5 is an explanatory diagram of the optical system according to Example 1.
Figure 6:
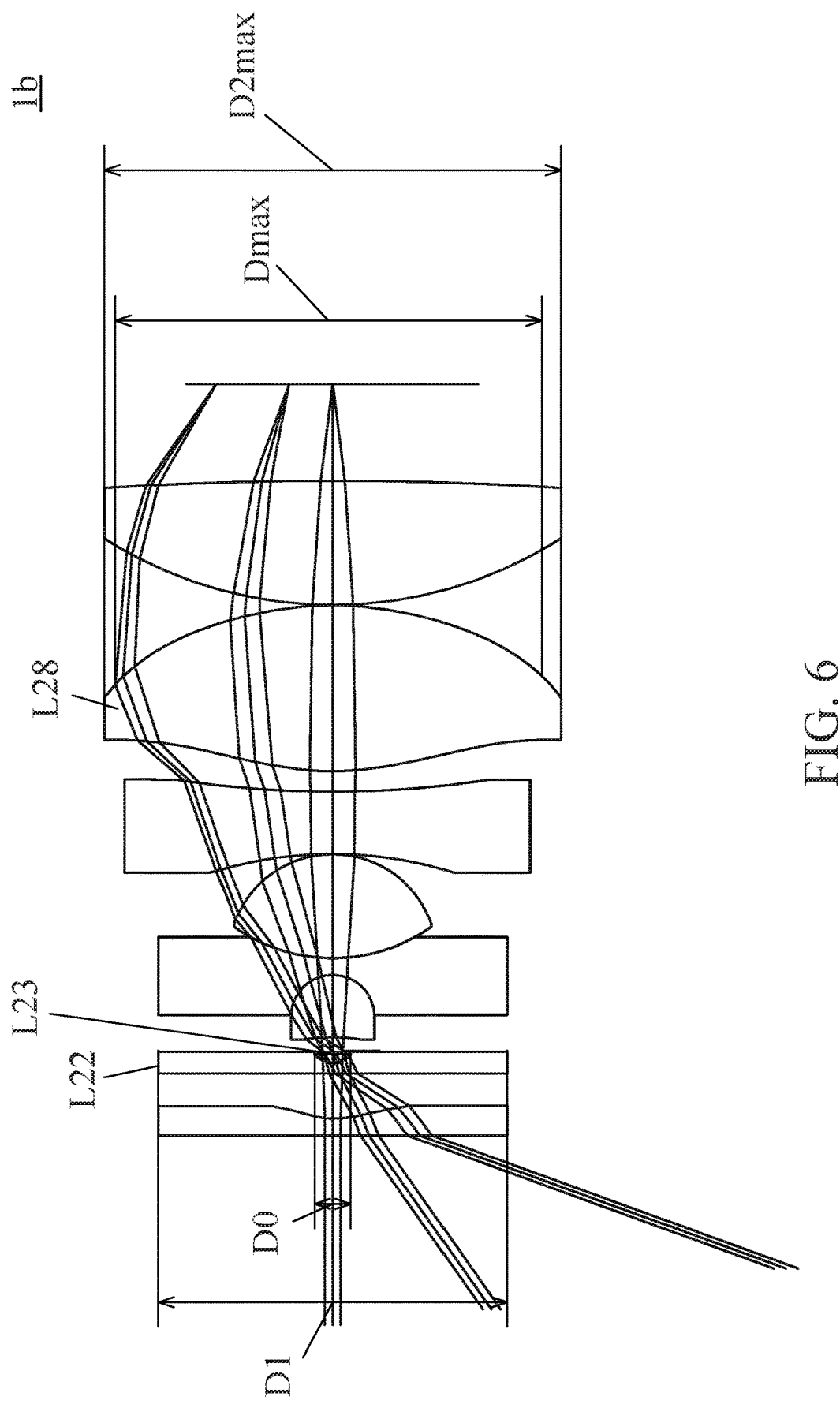
FIG. 6 is an explanatory diagram of the optical system according to Example 2.

FIG. 1 is a sectional view of an optical system 1a according to Example 1. FIG. 3 is a sectional view of an optical system 1b according to Example 2. FIG. 5 is an explanatory diagram of the optical system 1a according to Example 1. FIG. 6 is an explanatory diagram of the optical system 1b according to Example 2. The optical system according to each example is an imaging optical system for an image pickup apparatus such as a digital video camera, a digital still camera, a broadcasting camera, a film-based camera, and a surveillance camera. In each sectional view, a left side is an object side (front) and a right side is an image side (rear). In each sectional view, IM1 and IM2 are image planes, and an image sensor such as Complementary Metal-Oxide Semiconductor (CMOS) sensors and Charge Coupled Device (CCD) sensors is placed there.

The optical system according to each example includes a diaphragm (aperture stop) S1 or S2 that determines the F-number (aperture value) of the optical system, a cemented lens disposed adjacent to at least one of and the object side or the image side of the diaphragm S1 or S2. The term "cemented lens" here refers to a plurality of (two or more) lenses joined together. The cemented lens includes at least one negative lens. In each example, the following inequality (1) is satisfied:

$$1.5 < D1/D0 < 15.0 \tag{1}$$

where D0 is an effective diameter of at least one negative lens, and D1 is an outer diameter of at least one negative lens. Here, the effective diameter is a diameter (effective area) through which an effective light ray that contributes to imaging passes on the optical surface. In the inequality (1), the ratio between the outer diameter D1 and the effective diameter D0 is greater than a lower limit value of 1.5 and less than an upper limit value of 15.0.

In the case where the value is lower than the lower limit of the inequality (1), it becomes difficult to make the outer diameter of the cemented lens equal to the outer diameter of the other lens and a more complicated lens barrel structure is required, so that the cost of the optical system becomes higher. On the other hand, in the case where the value is higher than the upper limit of the inequality (1), the cost of the material of the negative lens for making the outer diameter of the cemented lens equal to the outer diameter of the other lens becomes higher.

The numerical range of the inequality (1) may be replaced with that of the following inequality (1a).

$$2.0 < D1/D0 < 14.5 \tag{1a}$$

In the inequality (1a), the ratio between the outer diameter D1 and the effective diameter D0 is greater than a lower limit value of 2.0 and less than an upper limit value of 14.5. The numerical range of the inequality (1) may be replaced with that of the following inequality (1b).

$$2.5 < D1/D0 < 14.0 \tag{1b}$$

In the inequality (1b), the ratio between the outer diameter D1 and the effective diameter D0 is greater than a lower limit value of 2.5 and less than an upper limit value of 14.0. The cemented lens may include a first cemented lens (cemented lens CE11 or CE21) disposed adjacent to the object side of the diaphragm S1 or S2, and a second cemented lens (cemented lens CE12 or CE22) disposed adjacent to the image side of the diaphragm S1 or S2. Each of the first cemented lens and the second cemented lens may consist of two or three lenses. Thereby, for example, the cemented lens can be easily manufactured. The first cemented lens may have a negative refractive power and the second cemented lens may have a positive refractive power. The negative lens may be a negative lens L12 or L22 constituting the first cemented lens. The negative lens may be a negative lens having the smallest effective diameter among the negative lenses constituting the optical system.

The following inequality (2) may be satisfied:

$$1.05 \leq D2max/D1 \leq 1.30 \tag{2}$$

where D2max is an outer diameter of a lens having the largest outer diameter among the lenses constituting the optical system 1a or 1b. In the inequality (2), the ratio between the outer diameter of a lens having the largest outer diameter among the lenses D2max and the outer diameter D1 is greater than or equal to a lower limit value of 1.05 and less than or equal to an upper limit value of 1.30.

The following inequality (3) may be satisfied:

$$0.80 \leq Dmax/D1 \leq 1.20 \tag{3}$$

where Dmax is an effective diameter of the lens having the largest effective diameter among the lenses constituting the optical system 1a or 1b. In the inequality (3), the ratio between the effective diameter of the lens having the largest effective diameter among the lenses Dmax and the outer diameter D1 is greater than or equal to a lower limit value of 0.80 and less than or equal to an upper limit value of 1.20.

In the case where the value is higher than the upper limit or lower than the lower limit of each of the inequalities (2) and (3), it becomes difficult to make the outer diameter of the cemented lens equal to the outer diameter of the other lens, a more complicated lens barrel structure is required, and the cost will increase.

The numerical ranges of the inequalities (2) and (3) may be replaced with those of the following inequalities (2a) and (3a), respectively:

$$1.08 \leq D2max/D1 \leq 1.28 \tag{2a}$$

$$0.83 \leq Dmax/D1 \leq 1.18 \tag{3a}$$

In the inequality (2a), the ratio between the outer diameter of a lens having the largest outer diameter among the lenses D2max and the outer diameter D1 is greater than or equal to a lower limit value of 1.08 and less than or equal to an upper limit value of 1.28. In the inequality (3a), the ratio between the effective diameter of the lens having the largest effective diameter among the lenses Dmax and the outer diameter D1 is greater than or equal to a lower limit value of 0.83 and less than or equal to an upper limit value of 1.18. The numerical ranges of the inequalities (2) and (3) may be replaced with those of the following inequalities (2b) and (3b), respectively:

$$1.10 \leq D2max/D1 \leq 1.25 \quad (2b)$$

$$0.87 \leq Dmax/D1 \leq 1.16 \quad (3b)$$

In the inequality (2b), the ratio between the outer diameter of a lens having the largest outer diameter among the lenses D2max and the outer diameter D1 is greater than or equal to a lower limit value of 1.10 and less than or equal to an upper limit value of 1.25. In the inequality (3b), the ratio between the effective diameter of the lens having the largest effective diameter among the lenses Dmax and the outer diameter D1 is greater than or equal to a lower limit value of 0.87 and less than or equal to an upper limit value of 1.16. The lower limit values and the upper limit values in the above inequalities are predetermined values. A description will now be given of the configuration of the optical system according to each example.

Example 1

A description will be given of the optical system $1a$ according to Example 1. As illustrated in FIG. 1, the optical system $1a$ includes, in order from the object side to the image side, a negative lens L11, a cemented lens CE11, a diaphragm S1, a cemented lens CE12, a positive lens L17, and a negative lens L18. The cemented lens CE11 includes a negative lens L12 and a positive lens L13. The cemented lens CE12 includes a positive lens L14, a negative lens L15, and a positive lens L16.

In this example, each cemented lens is made by applying an adhesive or the like between a positive lens and a negative lens to bring each lens into close contact with each other. In this example, the presence and absence of a filter and a wavelength range are not limited. These points are similarly applied to Example 2 described below.

Table 1 summarizes numerical data of the optical system $1a$ according to this example. The optical specification according to this example is set to a focal length of 6 mm, an image-side F-number (Fno) of 2.0, and a half angle of view of 0 to 60 degrees. A designed wavelength is 486.1 to 656.27 nm. A glass material of each example uses an optical glass made by OHARA Corporation or HOYA Corporation, but another equivalent product may be used.

TABLE 1

| | | Radius of curvature | Distance | Glass material |
|---|---|---|---|---|
| Object surface | | — | Infinity | |
| L11 | Sphere | Plane | 0.80 | SBSL7_OHARA |
| | Sphere | 4.603 | 2.17 | |
| L12 | Sphere | 30.363 | 0.80 | SBAL35_OHARA |
| L13 | Sphere | 8.807 | 2.00 | SNPH4_OHARA |
| | Sphere | −26.235 | 0.25 | |
| | Sphere | Plane | 0.00 | |
| S1 | Sphere | Plane | 0.66 | |
| L14 | Sphere | −69.588 | 3.00 | SBAL35_OHARA |
| L15 | Sphere | −8.655 | 0.80 | SNPH2_OHARA |
| L16 | Sphere | 11.085 | 5.00 | SBAL35_OHARA |
| | Sphere | −7.449 | 0.01 | |
| L17 | Aspheric surface 11 | 16.515 | 5.00 | MCTAFD305_HOYA |
| | Aspheric | −21.694 | 0.01 | |

TABLE 1-continued

| | | Radius of curvature | Distance | Glass material |
|---|---|---|---|---|
| | surface 12 | | | |
| L18 | Sphere | 20.336 | 4.84 | SLAH89_OHARA |
| | Sphere | 10.260 | 4.64 | |
| IM1 | | — | | |

Table 2 summarizes aspherical shape data of the optical system $1a$. The aspherical shape according to each example is expressed as follows:

$$Z = \frac{(1/R)h^2}{1 + \sqrt{1 - (1+k)(1/R)^2 h^2}} + Ah^4 + Bh^6 + Ch^8 + Dh^{10} \quad (4)$$

where a Z-axis is set to an optical axis direction, an h-axis is set to a direction orthogonal to the optical axis, and a light traveling direction is set positive, R is a paraxial radius of curvature, k is a conical coefficient, A to D are aspherical coefficients of fourth, sixth, eighth, and tenth orders. In addition, "e±XX" in each aspherical coefficient means "×10^{±XX}."

TABLE 2

| | Aspheric surface 11 | Aspheric surface 12 |
|---|---|---|
| Paraxial radius of curvature R | 16.51 | −21.69 |
| Conical coefficient k | 0.00 | 0.00 |
| Aspherical coefficient A of fourth order | −9.02E−05 | 1.44E−05 |
| Aspherical coefficient B of sixth order | −2.18E−06 | −2.75E−06 |
| Aspherical coefficient C of eighth order | 2.00E−08 | 2.17E−08 |
| Aspherical coefficient D of tenth order | 0.00E+00 | 0.00E+00 |

As illustrated in FIG. 5, the effective diameter D0 is an effective diameter of a concave portion of the cemented portion of the negative lens L12. The outer diameter D1 is an outer diameter of the negative lens L12. The effective diameter Dmax of the lens having the largest effective diameter among the lenses constituting the optical system $1a$ is an effective diameter of the surface on the image side of the positive lens L17. The outer diameter D2max of the lens having the largest outer diameter among the lenses constituting the optical system $1a$ is an outer diameter of the surface on the image side of the positive lens L17.

Figure 2:
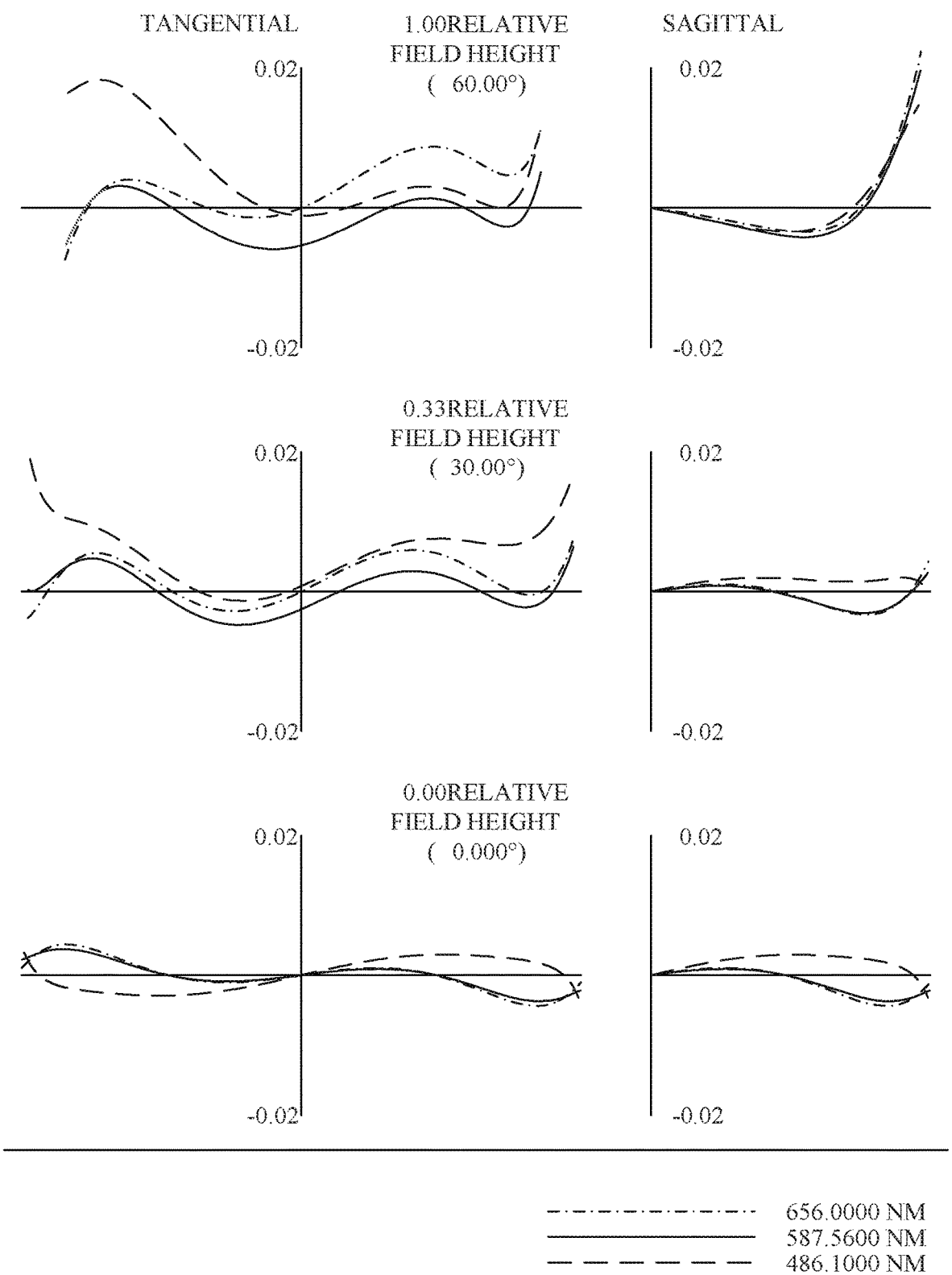
FIG. 2 is a lateral aberration diagram of the optical system according to Example 1.

FIG. 2 is a lateral aberration diagram of the optical system $1a$. FIG. 2 illustrates the lateral aberrations at three angles of view of the optical system $1a$ for the C-line (wavelength 656.3 nm), the d-line (wavelength 587.6 nm), and the F-line (wavelength 486.1 nm). The unit of the numerical value is set to millimeters (mm). As understood from FIG. 2, the curvature of field, chromatic aberration, and the like are satisfactorily corrected.

Example 2

A description will now be given of the optical system $1b$ according to Example 1. As illustrated in FIG. 3, the optical system $1b$ includes, in order from the object side to the image side, a negative lens L21, a cemented lens CE21, a diaphragm S2, a cemented lens CE22, a negative lens L27, a positive lens L28, and a positive lens L29. The cemented lens CE21 includes a negative lens L22 and a positive lens L23. The cemented lens CE22 includes a positive lens L24, a negative lens L25, and a positive lens L26. Each of the cemented lenses CE21 and CE22 is made by applying an adhesive or the like between the positive lens and the negative lens so that these lenses are in close contact with each other. In this example, the presence and absence of a filter and a wavelength range are not limited.

Table 3 summarizes numerical data of the optical system 1b according to this example. The optical specification of this example is set to a focal length of 3 mm, an image-side Fno of 4, and a half angle of view of 0 to 70 degrees. The designed wavelength is 486.1 to 656.27 nm.

TABLE 3

| | | Radius of curvature | Distance | Glass material |
|---|---|---|---|---|
| Object surface | | — | Infinity | |
| L21 | Sphere | Plane | 0.80 | LBSL7_OHARA |
| | Aspheric surface 21 | 4.764 | 2.17 | |
| L22 | Sphere | Plane | 0.50 | SLAH58_OHARA |
| L23 | Sphere | 1.122 | 0.50 | STIH6_OHARA |
| | Sphere | −14.681 | 0.10 | |
| | Sphere | Plane | 0.00 | |
| S2 | Sphere | Plane | 0.66 | |
| L24 | Sphere | −7.730 | 3.00 | SLAH58_OHARA |
| L25 | Sphere | −2.015 | 0.80 | STIH6_OHARA |
| L26 | Sphere | 8.148 | 5.00 | SPHM53_OHARA |
| | Sphere | −5.065 | 0.01 | |
| L27 | Aspheric surface 22 | −19.495 | 3.00 | STIH6_OHARA |
| | Aspheric surface 23 | 48.674 | 1.00 | |
| L28 | Sphere | 14.440 | 7.98 | MCTAFD305_HOYA |
| | Sphere | −16.208 | 0.01 | |
| L29 | Sphere | 20.362 | 6.00 | SLAH89_OHARA |
| | Sphere | −172.161 | 4.64 | |
| IM2 | | — | | |

Table 4 summarizes aspherical shape data of the optical system 1b.

TABLE 4

| | Aspheric surface 21 | Aspheric surface 22 | Aspheric surface 23 |
|---|---|---|---|
| Paraxial radius of curvature R | 4.764 | 14.440 | −16.208 |
| Conical coefficient k | 0 | 0.00 | 0.00 |
| Aspherical coefficient A of fourth order | −0.00975 | −2.86E−04 | 1.05E−04 |
| Aspherical coefficient B of sixth order | 0.0004195 | 3.43E−07 | −9.48E−07 |
| Aspherical coefficient C of eighth order | −1.20E−05 | 0.00E+00 | 0.00E+00 |
| Aspherical coefficient D of tenth order | 3.75E−08 | 0.00E+00 | 0.00E+00 |

As illustrated in FIG. 6, the effective diameter D0 is an effective diameter of a concave portion of the cemented portion of the negative lens L22. The outer diameter D1 is an outer diameter of the negative lens L22. The effective diameter Dmax of the lens having the largest effective diameter among the lenses constituting the optical system 1b is an effective diameter of the surface on the image side of the positive lens L28. The outer diameter D2max of the lens having the largest outer diameter among the lenses constituting the optical system 1b is an outer diameter of the surface on the image side of the positive lens L28.

Figure 4:
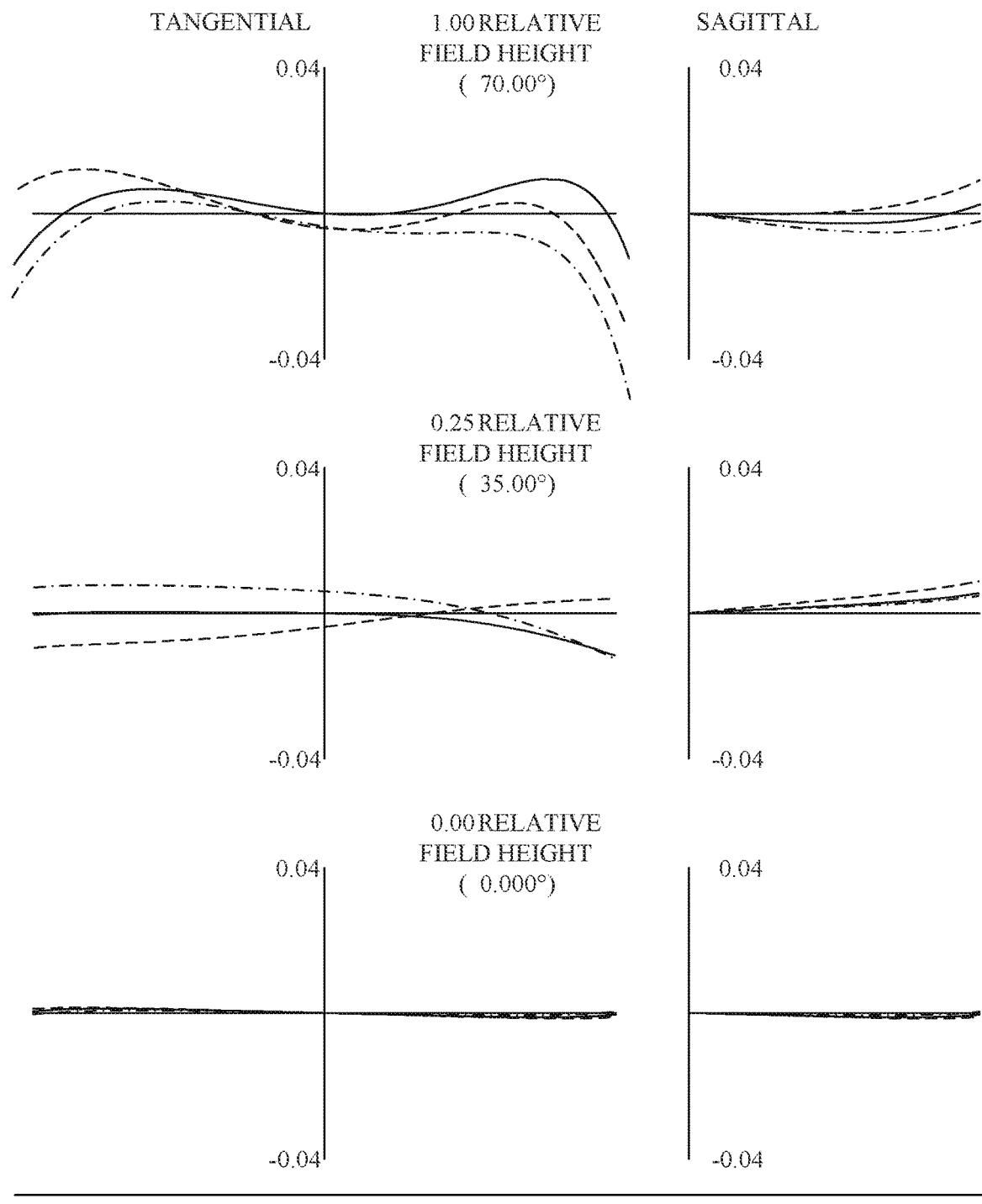
FIG. 4 is a lateral aberration diagram of the optical system according to Example 2.

FIG. 4 is a lateral aberration diagram of the optical system 1b. FIG. 4 illustrates the lateral aberrations at three angles of view of the optical system 1b for the C-line (wavelength 656.3 nm), the d-line (wavelength 587.6 nm), and the F-line (wavelength 486.1 nm). The unit of the numerical value is set to millimeters (mm). As understood from FIG. 4, the curvature of field, chromatic aberration, and the like are satisfactorily corrected.

Table 5 summarizes numerical data of each inequality in each example.

TABLE 5

| | D2max | Dmax | D0 | D1 | D1/D0 | Dmax/D1 | D2max/D1 |
|---|---|---|---|---|---|---|---|
| Example 1 | 10.0 | 8.00 | 3.25 | 9.00 | 2.77 | 0.89 | 1.11 |
| Example 2 | 26.0 | 24.00 | 1.60 | 21.00 | 13.13 | 1.14 | 1.24 |

Figure 7:
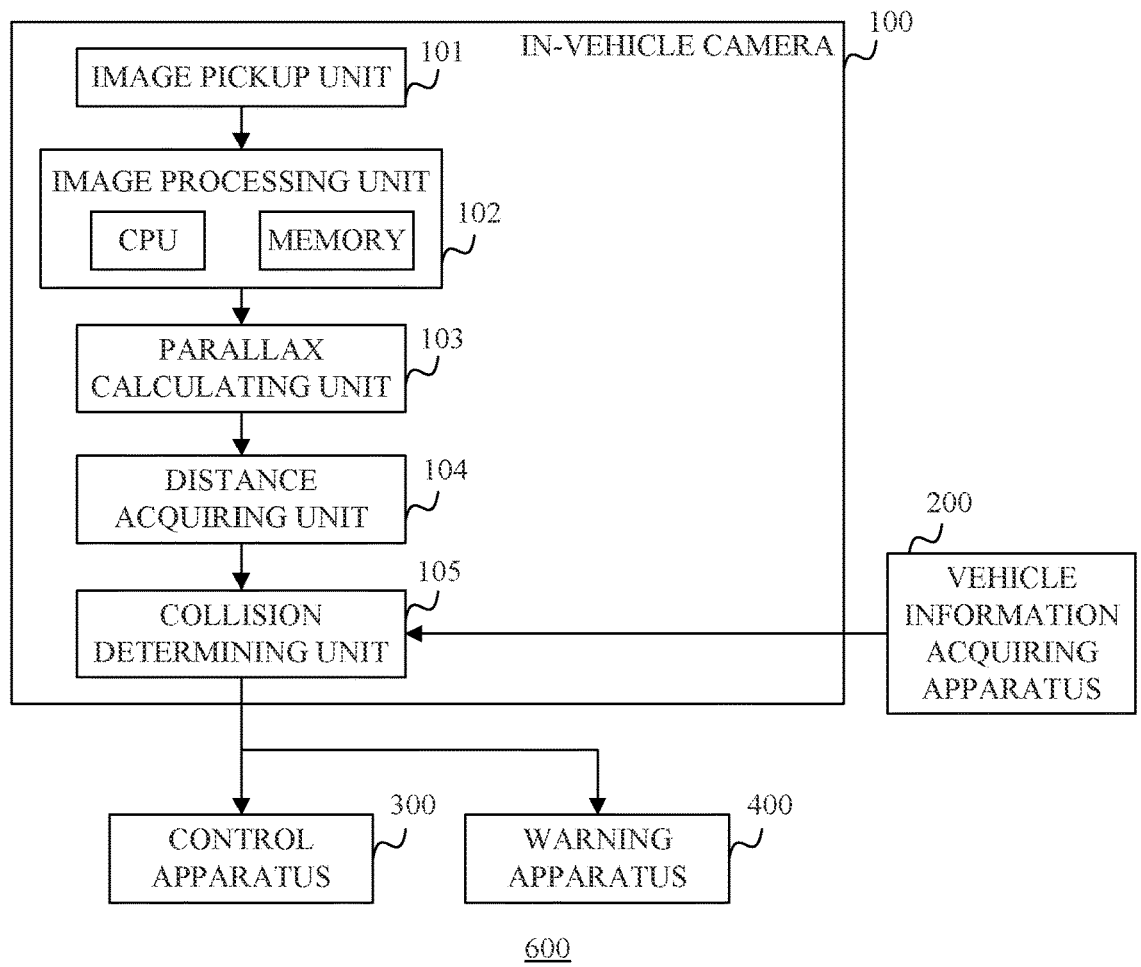
FIG. 7 is a block diagram of an in-vehicle system including the optical system according to each example.
Figure 8:
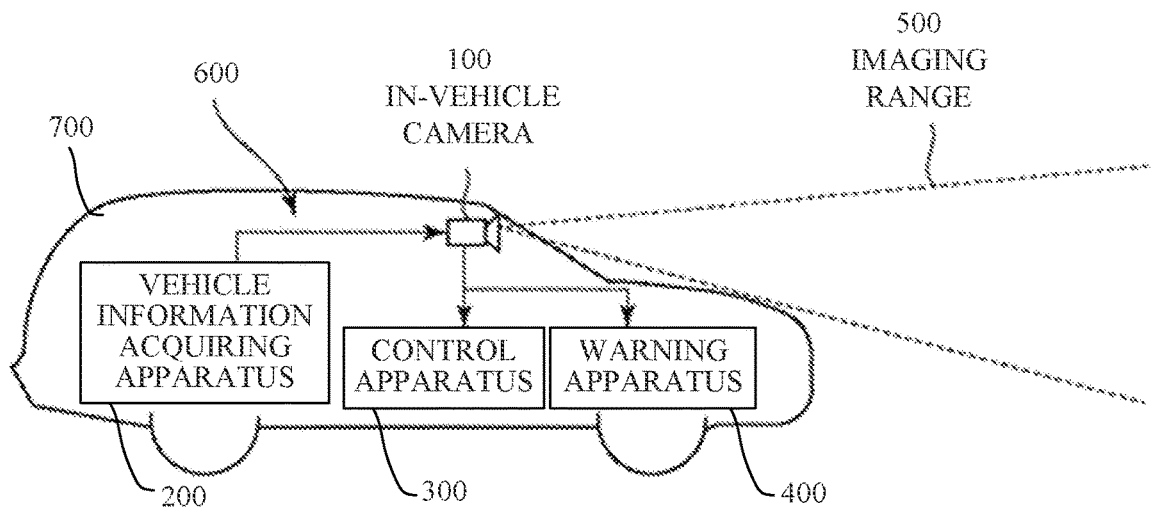
FIG. 8 is a schematic diagram of main part of a vehicle provided with the optical system according to each example.
Figure 9:
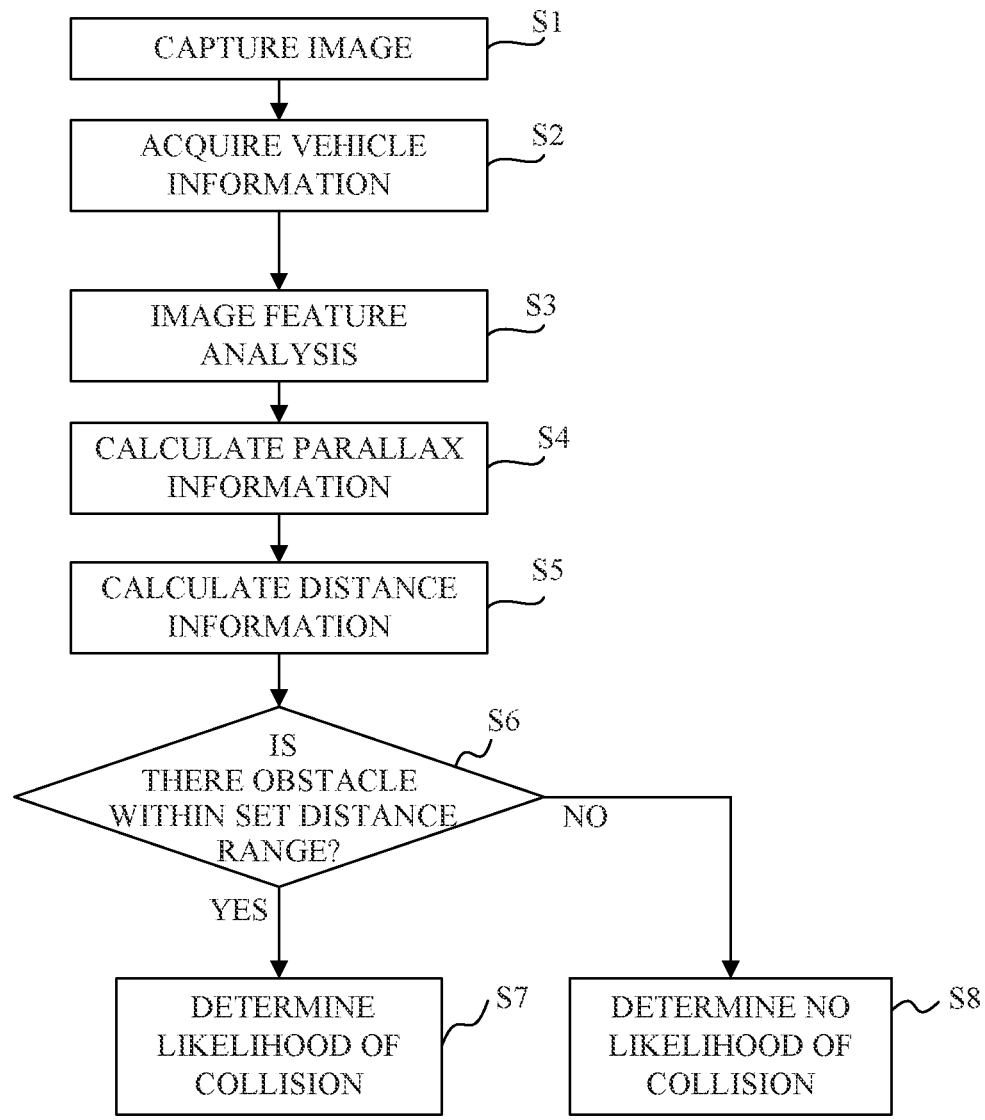
FIG. 9 is a flowchart illustrating an operation example of the in-vehicle system including the optical system according to each example.

Referring now to FIGS. 7 to 9, a description will be given of an in-vehicle camera 100 including an optical system (optical apparatus) according to each example and an in-vehicle system (driving support apparatus) 600 including the in-vehicle camera 100. FIG. 7 is a configuration diagram of the in-vehicle camera 100 and the in-vehicle system 600 having the same. The in-vehicle system 600 is a system held by a movable moving body (moving apparatus) such as an automobile (vehicle) and configured to support driving (steering) of the vehicle based on image information around the vehicle acquired by the in-vehicle camera 100. FIG. 8 is a schematic view of a vehicle 700 as a moving apparatus including the in-vehicle system 600. FIG. 8 illustrates a case where an imaging range 500 of the in-vehicle camera 100 is set to a front of the vehicle 700, but the imaging range 500 may be set to a rear or side of the vehicle 700.

As illustrated in FIG. 7, the in-vehicle system 600 includes the in-vehicle camera 100, a vehicle information acquiring apparatus 200, a control apparatus (ECU: electronic control unit) 300, and a warning apparatus 400. The in-vehicle camera 100 includes an image pickup unit (image pickup apparatus or circuit) 101, an image processing unit or circuit 102, a parallax calculating unit 103, a distance acquiring unit (acquiring unit) 104, and a collision determining unit 105. The image processing unit 102, the parallax calculating unit 103, the distance acquiring unit 104, and the collision determining unit 105 constitute a processing unit. The image pickup unit 101 includes an optical system according to any one of the above examples and an image sensor (imaging-plane phase-difference sensor). The image processing unit or circuit 102 may contain a Central Processing (CPU) or a programmable processor that can execute instructions to perform specified operations. Other devices such as Random Access Memory (RAM), Reade Only Memory (ROM), Electrically Erasable Read Only Memory (EEROM) memory devices or circuits. A memory (RAM, ROM, or EEROM) may store a program or instructions that, when executed by the CPU or processor, cause the CPU or processor to performs specified operations such as calculating parallax (in parallax calculating unit 103), acquiring distance (in distance acquisition unit 104), and determining collision (in collision determining unit 105). These operations are shown in FIG. 9.

FIG. 9 is a flowchart illustrating an operation example of the in-vehicle system 600 according to this example. A description will now be given of the operation of the in-vehicle system 600 with reference to this flowchart.

First, in step S1, an image pickup circuit 101 is used to image an object such as an obstacle or a pedestrian around the vehicle, and a plurality of image data (parallax image data) are acquired.

In step S2, vehicle information is acquired by the vehicle information acquiring apparatus 200. The vehicle information is information including a speed, a yaw rate, a steering angle, and the like of the vehicle.

In step S3, the image processing unit 102 performs image processing for the plurality of image data acquired by the image pickup unit 101. More specifically, image feature analysis is performed to analyze a feature amount such as an edge amount, direction, and density value, in image data. Here, the image feature analysis may be performed for each of the plurality of image data or may be performed only for part of the image data among the plurality of image data.

In step S4, the parallax calculating unit 103 calculates parallax (image shift) information between the plurality of image data acquired by the image pickup unit 101. A method for calculating parallax information can use a known method such as the Sequential Similarity Detection Algorithms (SSDA) method or the area correlating method, and thus a description thereof will be omitted in this example. Steps S2, S3, and S4 may be performed in the above order or in parallel with each other.

In step S5, the distance acquiring unit 104 acquires (or calculates) distance information from the object imaged by the image pickup unit 101. The distance information can be calculated based on the parallax information calculated by the parallax calculating unit 103 and internal and external parameters of the image pickup unit 101. The distance information here is information on a relative position with the object such as a distance from the object, a defocus amount, an image shift amount, and the like, and may directly represent a distance value of the object in the image or indirectly represent information corresponding to the distance value.

Next, in step S6, using the vehicle information acquired by the vehicle information acquiring apparatus 200 and the distance information calculated by the distance acquiring unit 104, the collision determining unit 105 determines whether or not the distance to the object is included in a preset distance range. This configuration can determine whether or not the object exists within the set distance range around the vehicle, and determine a likelihood of collision between the vehicle and the object. The collision determining unit 105 determines that "there is the likelihood of collision" in the case where the object exists within the set distance range (step S7) and determines that "there is no likelihood of collision" in the case where the object does not exist within the set distance range (step S8).

Next, in the case where the collision determining unit 105 determines that "there is the likelihood of collision," the collision determining unit 105 notifies (transmits) the determination result to the control apparatus 300 and the warning apparatus 400. At this time, the control apparatus 300 controls the vehicle based on the determination result of the collision determining unit 105 (step S6), and the warning apparatus 400 warns the vehicle user (vehicle driver, passenger) based on the determination result of the collision determining unit 105 (step S7). The determination result may be notified to at least one of the control apparatus 300 and the warning apparatus 400.

The control apparatus 300 can control the movement of the vehicle by outputting a control signal to a driving unit (engine, motor, etc.) of the vehicle. For example, control is made in the vehicle such as applying a brake, releasing the accelerator, turning the steering wheel, generating a control signal for generating a braking force on each wheel, and suppressing the output of the engine or motor. The warning apparatus 400 warns the user, for example, by issuing a warning sound (alarm), by displaying warning information on a screen of a car navigation system, or by vibrating the seat belt or steering wheel.

Thus, the in-vehicle system 600 according to this example can effectively detect the object by the above processing and avoid the collision between the vehicle and the object. In particular, applying the optical system according to the above example to the in-vehicle system 600 can detect an object and determine the likelihood of collision over a wide angle of view while reducing the size of the entire in-vehicle camera 100 and maintaining the arrangement freedom.

In this example, the in-vehicle camera 100 includes a single image pickup unit 101 having an imaging-plane phase-difference sensor, but the disclosure is not limited to this example and the in-vehicle camera 100 may use a stereo camera having two image pickup units. In this case, instead of the imaging-plane phase-difference sensor, image data are simultaneously acquired by the two synchronized image pickup units and the two image data are used for processing similar to the above processing. However, as long as a difference in image pickup time between these two image pickup units is known, the two image pickup units may not be synchronized.

Various examples are applicable to the calculation of the distance information. One example is to use a pupil-division type image sensor (light-receiving unit) having a plurality of pixel portions regularly arranged in a two-dimensional array as the image sensor for the image pickup unit 101. In the pupil-division type image sensor, one pixel portion includes a microlens and a plurality of photoelectric converters, receives a pair of light beams passing through different areas in the pupil of an optical system, and can output paired image data from the photoelectric converters.

Next, the image shift amount of each area is calculated by the correlation calculation between the paired image data, and image shift map data representing a distribution of the image shift amount is calculated by the distance acquiring unit 104. Alternatively, the distance acquiring unit 104 may further convert the image shift amount into a defocus amount, and generate defocus map data representing the distribution of the defocus amount (distribution on the two-dimensional plane of the captured image). The distance acquiring unit 104 may acquire the distance map data representing a distance from the object converted from the defocus amount.

At least one of the in-vehicle system 600 and the vehicle 700 may include a notification apparatus (notification unit) for notifying the manufacturer of the in-vehicle system, the seller (dealer) of the moving apparatus, or the like of any collisions between the vehicle 700 and the obstacle. For example, the notification unit may use a unit that transmits information (collision information) on the collision between the vehicle 700 and the obstacle to a preset external notification destination by e-mail or the like.

Thus, the configuration for automatically notifying the collision information through the notification unit can promote processing such as inspection and repair after the collision. The notification destination of the collision information may be an insurance company, a medical institution, the police, or another arbitrary destination set by the user. The notification unit may notify the notification destination of not only the collision information but also the failure information of each component and consumption information on consumables. The presence or absence of a collision may be detected based on the distance information acquired by the output from the above light-receiving unit or by another detecting unit (sensor).

In this example, the in-vehicle system 600 is applied to the driving support (collision damage mitigation), but the in-vehicle system 600 is not limited to this example and may be applied to cruise control (including adaptive cruise control) and automatic driving. The in-vehicle system 600 is applicable not only to a vehicle such as an automobile but also to a moving body such as a ship, an aircraft, or an industrial robot. The in-vehicle system 600 is applicable not only to the moving body but also to various units that utilize object recognition such as intelligent transportation systems (ITS).

In this example, the optical system is applied to the image pickup unit in the in-vehicle system, but the disclosure is not limited to this example. For example, the optical system may be applied to an image pickup apparatus such as a digital still camera, a digital video camera, or a film-based camera, or may be applied to an optical apparatus such as a telescope or a projection apparatus such as a projector.

Each example can provide an optical system, an image pickup apparatus, an in-vehicle system, and a moving apparatus, each of which can be easily manufactured and have a high performance.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-143951, filed on Sep. 3, 2021, which is hereby incorporated by reference herein in its entirety.

What is claimed is:

1. An optical system comprising:
    a diaphragm; and
    a first cemented lens disposed adjacent to an object side of the diaphragm,
    wherein the first cemented lens includes a negative lens, and
    wherein the following inequality is satisfied:

$1.5 < D1/D0 < 15.0$ where $D0$ is an effective diameter of the negative lens, and $D1$ is an outer diameter of the negative lens.

2. The optical system according to claim 1, wherein the first cemented lens consists of two or three lenses.

3. The optical system according to claim 1, wherein the first cemented lens has a negative refractive power.

4. The optical system according to claim 1, further comprising a second cemented lens disposed adjacent to an image side of the diaphragm.

5. The optical system according to claim 4, wherein the second cemented lens includes a negative lens, and
    wherein the negative lens of the second cemented lens satisfies the inequality.

6. The optical system according to claim 4, wherein the second cemented lens consists of two or three lenses.

7. The optical system according to claim 4, wherein the second cemented lens has a positive refractive power.

8. The optical system according to claim 1, wherein the negative lens is a negative lens having the smallest effective diameter among negative lenses constituting the optical system.

9. The optical system according to claim 1, wherein the following inequality is satisfied:

$1.05 \leq D2max/D1 \leq 1.30$ where $D2max$ is an outer diameter of a lens having the largest outer diameter among lenses constituting the optical system.

10. The optical system according to claim 1, wherein the following inequality is satisfied:

$0.80 \leq Dmax/D1 \leq 1.20$ where $Dmax$ is an effective diameter of a lens with the largest outer diameter among lenses constituting the optical system.

11. An image pickup apparatus comprising:
    the optical system accordingly to claim 1; and
    an image sensor configured to capture an object via the optical system.

12. An in-vehicle system comprising:
    the image pickup apparatus according to claim 11; and
    a processor configured to determine a likelihood of collision between a vehicle and an object based on distance information on the object acquired by the image pickup apparatus.

13. A moving apparatus comprising the image pickup apparatus according to claim 11,
    wherein the moving apparatus can be moved while holding the image pickup apparatus.

* * * * *